Figure 1:
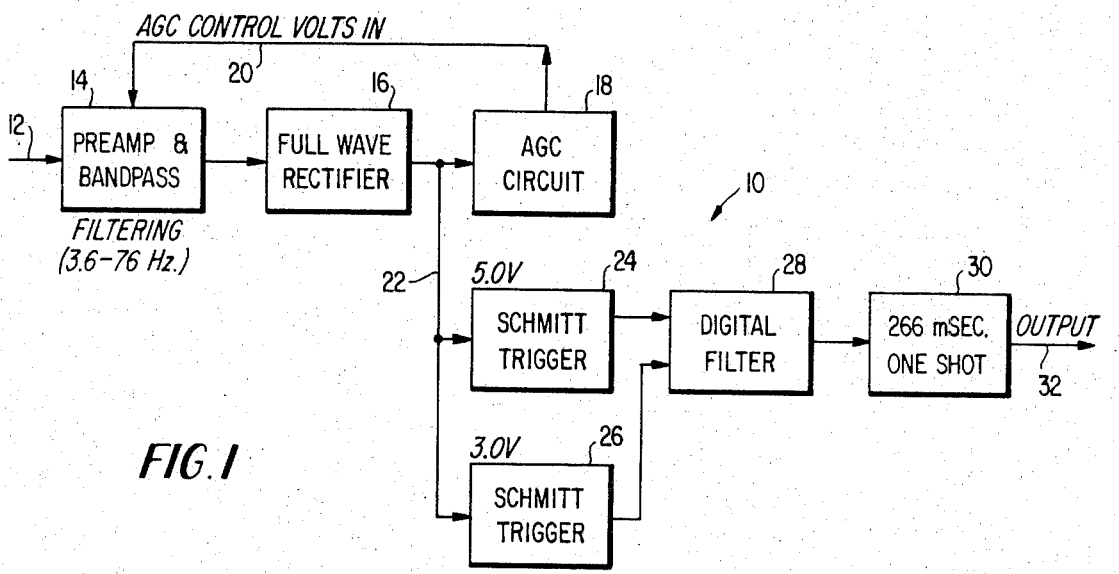

United States Patent
Ragsdale

[15] 3,699,360
[45] Oct. 17, 1972

[54] ONE-SHOT MONOSTABLE MULTIVIBRATOR

[72] Inventor: Charles W. Ragsdale, Takoma Park, Md.

[73] Assignee: The United States of America as represented by the Secretary of the Army

[22] Filed: Aug. 15, 1969

[21] Appl. No.: 850,403

Related U.S. Application Data

[62] Division of Ser. No. 789,694, Jan. 8, 1069, Pat. No. 3,587,694.

[52] U.S. Cl..................................307/273, 307/288
[51] Int. Cl..............................................H03k 3/284
[58] Field of Search............307/273, 288, 290, 291; 331/113

[56] References Cited

UNITED STATES PATENTS

| 3,282,632 | 11/1966 | Arsem | 307/288 X |
| 3,323,068 | 5/1967 | Woods | 307/273 X |
| 3,376,429 | 4/1968 | Atkins et al | 307/288 X |
| 3,376,434 | 4/1968 | Weinstock | 307/288 X |
| 3,407,340 | 10/1968 | Hufnagel | 307/288 X |

Primary Examiner—Herman Karl Saalbach
Assistant Examiner—R. C. Woodbridge
Attorney—Harry M. Saragovitz, Edward J. Kelly, Herbert Berl and J. D. Edgerton

[57] ABSTRACT

Disclosed is a one-shot multivibrator of simplified and inexpensive construction which produces a constant width output pulse and which once triggered is not affected by additional trigger pulses until after the timing cycle is completed. A charged capacitor and resistor maintain a pair of transistors conducting and the transistors change state when current flow is diverted from them through a third transistor in response to a triggering signal. The multivibrator output is connected by a negative feedback lead to the third transistor. Also disclosed is a rate monitoring portion of an electrical heart monitor incorporating the multivibrator.

7 Claims, 2 Drawing Figures

PATENTED OCT 17 1972　　　　　　　　　　　　　　　　3,699,360

INVENTOR
CHARLES W. RAGSDALE

BY Harry M. Saragovitz, Edward J. Kelly,
Herbert Berl and J. D. Edgerton

ATTORNEYS

ONE-SHOT MONOSTABLE MULTIVIBRATOR

This application is a division of copending application Ser. No. 789,649, now U.S. Pat. No. 3,587,694 filed Jan. 8, 1969.

This invention relates to a one-shot monostable multivibrator and more particularly to a simple, accurate, and reliable multivibrator which produces a constant width output pulse and which, when once triggered, is not affected by additional trigger pulses until after the timing cycle of the multivibrator is completed. It is particularly constructed for use in the electric heart monitor shown and described in copending application Ser. No. 789,694, now U.S. Pat. No. 3,587,694 filed Jan. 8, 1969.

In the aforementioned copending application, there is disclosed an electric heart monitor for monitoring electrocardiogram waveforms of a human heart to provide indications of dire cardiac states. The unit is particularly constructed for military use in field hospitals and the like and indicates the kind of cardiac arrest occurring (fibrillation or standstill) since the resuscitative techniques for each type of arrest differ. In addition, the monitor is portable, operates on batteries, and meets military environmental standards by operating over a −40° to +130°F. temperature range. It is especially designed for field use and other situations in which oscilloscopes and paper writers are not available or their use is not feasible.

The heart monitor receives a differential input which is passed through a preamplifier which amplifies the electrocardiogram signal and provides bandpass filtering having a 3.6 to 76 Hz (approximately 18 Db/octave) bandpass. The signal is then passed through a full wave rectifier to the automatic gain control and to level detectors feeding a pulse width discriminator (digital filter) triggered by the level detector pulses. The digital filter discriminates against noise as well as other myocardial signals, such as the T wave, and supplies an output pulse to a one-shot monostable multivibrator which cannot be retriggered until its timing cycle is complete.

The present invention is directed to an improved transistorized multivibrator circuit and more particularly to one that is cycled only once per each triggering pulse. It is constructed to tolerate a 33 percent change in power supply voltage without significantly affecting the output pulse width, operates on less than 1.5 mw. of power, and can provide on the order of 99 percent duty cycle output. The multivibrator triggers on only one input pulse polarity and is not significantly affected by temperature variations over a −40° to +130° F. range.

It is therefore one object of the present invention to provide an improved one-shot multivibrator.

Another object of the present invention is to provide a multivibrator for producing an output pulse having a constant width.

Another object of the present invention is to provide a monostable multivibrator particularly adapted for use in a portable electronic heart monitor.

Another object of the present invention is to provide a transistorized one-shot multivibrator of simplified and reliable construction which when once triggered is not affected by additional trigger pulses until after its timing cycle is completed.

Figure 2:
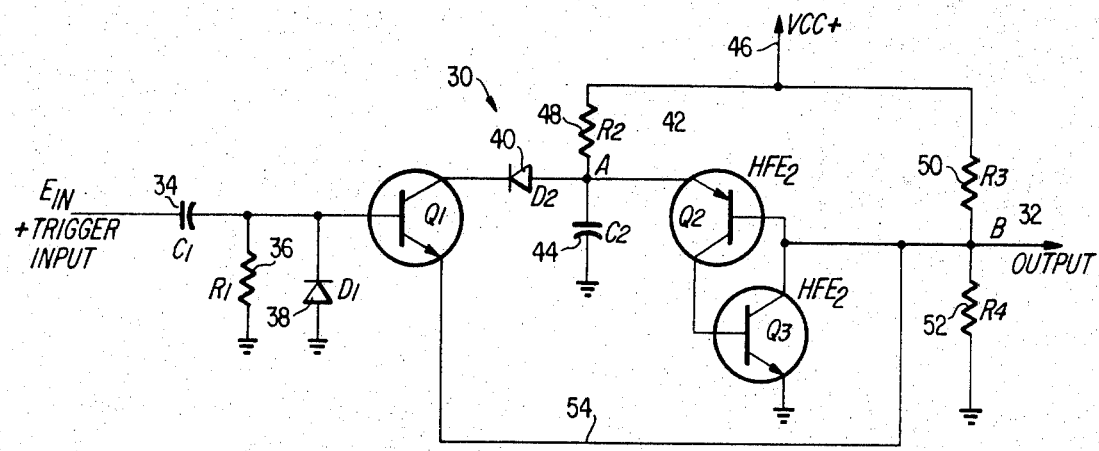

These and further objects and advantages of the invention will be more apparent upon reference to the following specification, claims, and appended drawings, wherein:

FIG. 1 is a block diagram of a cardiac wave detecting circuit forming a part of an electronic heart monitor including the monostable multivibrator of the present invention; and FIG. 2 is a detailed circuit diagram of the one-shot or monostable multivibrator.

At the beginning of a human heart's pumping cycle, the isometric contraction of the ventricular muscle mass generates a pronounced electrical signal known as the QRS wave complex of the electrocardiogram, commonly called EKG. FIG. 1 is a block diagram of a circuit, generally indicated at 10, incorporated in an electrical heart monitor which is useful in detecting the R wave portion of the QRS complex to give an indication of heart rate. The input electrical signal appearing on lead 12 of the circuit 10 is in the form of an electrocardiogram waveform and is applied to a preamplifier and bandpass filter 14. Preamplifier 14 provides a gain from 1 K to 50 K adjustable by a control voltage applied to a field effect transistor. It also provides bandpass filtering with one-half power points at 3.6 Hz and 76 Hz and approximately 60 Db/decade rolloff above and below these points. The output impedance of the preamplifier is 24 K.

The preamplifier 14 passes the important frequencies of the EKG (QRS complex, fibrillation) while offering some rejection of high frequency noise (muscle potentials at 100 Hz or greater, 120 Hz, etc.) and low frequency EKG components (DC electrode voltage, S-T segment shifts, etc.). The output of the preamplifier 14 is applied to a full wave rectifier 16 so that the circuitry following the rectifier output will not be affected by input signal polarity changes.

From the full wave rectifier, the signal is applied to an automatic gain control circuit (AGC) 18 which feeds back a gain control signal by way of lead 20 to preamplifier 14. The AGC circuit 18 originally applies a control voltage to the preamplifier 14 that gives a maximum preamplifier gain. When the full wave rectifier output is greater than the AGC control point (6.0 V), the AGC output voltage linearly decreases with time to decrease the preamplifier gain, until the rectifier output is below the 6.0 V level. The maximum gain decrease time is 0.5 seconds. The AGC output voltage then linearly increases with time (increasing preamplifier gain) until the rectifier output is above the 6.0 V level again. The maximum gain increase time is 15 seconds.

The AGC output acts with the full wave rectifier 16 to keep the peak preamp signal amplitude at 6.0 V. Because of the capacitive coupling of the full wave rectifier, the AGC and the rectifier act to DC shift the signal and affect its amplitude, giving equal positive and negative peaks at the preamp output, after equilibrium is reached. Because of the slow reaction time of the AGC, only long term amplitude changes are completely adjusted for.

The output of full wave rectifier 16 is supplied by a lead 22 to a 5.0 V Schmitt trigger 24 and a 3.0 V Schmitt trigger 26. These in turn feed the two inputs of a digital filter 28. The digital filter is actually a pulse width discriminator and performs the following three functions.

First, the digital filter does not provide an output if the 5.0 V Schmitt output is 0 or the 3.0 V Schmitt output pulse width is less than 10 ms. If either of the latter conditions are met, the circuit is also reset. The latter conditions are met with excess muscle potentials, 60 Hz and 120 Hz.

Secondly, the digital filter does provide an output if there is a 5.0 V Schmitt output along with a 10–30 ms. 3.0 V Schmitt pulse width. If these conditions exist, for 400 ms. (refractory period) after the 10–30 ms. pulse, 3.0 V Schmitt pulses greater than 30 ms. are rejected.

Thirdly, digital filter 28 provides an output if there is a 5.0 V Schmitt output along with a greater than 30 ms. 3.0 V Schmitt pulse width. No refractory period then exists.

The first condition, or case 1 above, applies when either pure 60 Hz, or 120 Hz, is received (as with an open lead) or when excessive noise is riding on the EKG (such as 60 Hz, 120 Hz, and muscle potentials). These noise artifacts have widths less than 10 ms., while EKG signals have wider widths.

Condition or case 2 above applies and is useful when a narrow width QRS complex accompanied with a large amplitude, long latency T wave occurs. The T wave is rejected by the digital filter 28.

Condition on case 3 above applies when most other QRS complexes are received. In both cases 2 and 3, a considerable amount of noise is tolerated riding upon the signal. Noise riding on the signal itself still allows the meeting of condition 2 or condition 3 with the proper pulse width. Only when the signal is so completely obscured by noise that the EKG peak is driven too far below the 3.0 V Schmitt threshold does a 0 digital filter output exist.

Digital filter 28 feeds a one-shot multivibrator 30. That is, the digital filter triggers the one-shot which emits constant width pulses. In addition, during the one-shot pulse, additional filter outputs will have no affect. Hence, signals (such as the typical T wave) that are not rejected by the filter are blanked out by the one-shot multivibrator 30. The one-shot width is the maximum to still allow a 225 beat per minute maximum heart rate. The output from the one-shot multivibrator 30 appearing on lead 32 may be applied to a rate measuring circuit (not shown) for indicating heart rate.

FIG. 2 is a detailed circuit diagram of the one-shot multivibrator 30 of FIG. 1. The circuit comprises an input capacitor 34, labeled $C_1$, and a shunt resistor 36, labeled $R_1$, the latter in parallel with a rectifier diode 38. The input is fed through a first transistor $Q_1$ and by way of a second diode 40 to a transistor pair 42 comprising transistors $Q_2$ and $Q_3$. The input of the transistors is shunted by a capacitor 44, labeled $C_2$, and receives a power supply signal from a source (not shown) of positive potential by way of lead 46 and resistor 48. The output is connected to the power supply by way of additional resistors 50 and 52. The negative feedback lead 54 connects the emitter of transistor $Q_1$ to the base of transistor $Q_2$ and the collector of transistor $Q_3$.

The purpose of the one-shot multivibrator 30 is to tolerate 33 percent change in power supply voltage without significantly affecting pulse width and to operate on less than 1.5 mw. of power. It can provide on the order of 99 percent duty cycle output and is not significantly affected by temperature variations over a −40° to +130° F. range. Once triggered, it is not affected by additional trigger pulses until after the timing cycle is completed and it triggers on only one input pulse polarity. Incoming pulses are differentiated by capacitor 34 and resistor 36 and are DC restored by diode 38. The peak of the input voltage must not be greater than the maximum voltage at the output (given by $$\frac{R_4 V_{cc+}}{R_3 + R_4}).$$

Initially, transistors $Q_2$ and $Q_3$ are saturated, clamping points A and B essentially to ground. For this to occur, $$\frac{V_{cc+} HFE_2}{R_2} \text{ sat.} \geq \frac{V_{cc+}}{R_3}$$

for practical purposes. When an input pulse is received, transistor diverts current flow from $Q_2$ and $Q_3$, releasing their regeneration. Point B switches to $$\frac{R_4 V_{cc+}}{R_3 + R_4}.$$

$Q_1$ is then turned off and further trigger pulses will not be effective until the end of the timing cycle. Diode 40 assures that transistor $Q_1$ collector-base junction will not be forward biased and affect the timing. Capacitor 44 charges exponentially through resistor 48 toward $V_{cc+}$. When the voltage at Point A reaches the voltage at Point B plus $Veb_{Q_2}$, $Q_2$ and $Q_3$ regenerate and clamp the output at essentially ground.

The timing of the circuit is given by the equation:

$$T = R_2 C_2 \, \text{Ln} \, \frac{V_{cc+} - Veb_{Q_2} - V_{sat.Q_3}}{V_{cc+} \frac{-R_4 V_{cc+}}{R_3 + R_3} - V_{eb_{Q_2}}}$$

if $Veb_{Q_2}$ and $V_{sat.Q_3}$ are small with respect to $V_{cc+}$, and (1) if $Veb_{Q_2}$ is small with respect to $$V_{cc+}\left(1 - \frac{R_4}{R_3 + R_4}\right), \quad (2)$$

the equation reduces to:

$$T = R_2 C_2 \text{Ln} \frac{V_{cc+}}{V_{cc+}\left(1 - \frac{R_4}{R_3 + R_4}\right)}, \text{ or if } R_4 = R_3, T = R_2 C_2 \text{Ln} \, 2$$

Hence, the timing is not dependent upon power supply changes or Veb, $V_{sat.}$ changes providing conditions (1) and (2) are met.

It is apparent from the above that the present invention provides an improved one-shot monostable multivibrator particularly suited for use in a small battery operated heart monitor. The multivibrator is of simplified and inexpensive construction and may be made of small size and weight so as to provide a reliable and accurate output with a constant output pulse width.

What is claimed and desired to be secured by United States Letters Patent is:

1. A monostable multivibrator comprising a pair of solid state switching devices, an output lead coupled to both said devices, means including an R-C timing circuit coupled to said devices for supplying current to said devices to maintain them conducting, a third solid state switching device coupled to said pair of devices and responsive to a trigger signal for diverting current from said pair of devices through said third device whereby said pair of devices switch to a nonconducting state, and feedback means coupling said output lead to said third device whereby said third device changes state in response to a change in state of said pair of switching devices.

2. A monostable multivibrator comprising a pair of solid state switching devices, an output lead coupled to both said devices, means including an R-C timing circuit coupled to said devices for supplying current to said devices to maintain them conducting, means coupled to said devices and responsive to a trigger signal for diverting current from said devices whereby said devices switch to a nonconducting state, said current diverting means comprising a third solid state switching device, said switching devices all being transistors each having emitter, collector and base electrodes, the emitter-collector circuit of one of said pair of transistors being coupled to the base of the other of said pair of transistors, said other transistor having its emitter-collector circuit coupled to the base of said one transistor, said output lead being coupled to the base of said one transistor, and a feedback lead coupling said output lead to said third transistor whereby said third transistor changes state in response to a change in state of said pair of transistors.

3. A multivibrator according to claim 2 wherein said feedback lead is coupled to the emitter-collector circuit of said third transistor, and means coupled to said third transistor for applying an input signal to its base.

4. A multivibrator according to claim 3 wherein said input means includes a differentiator and DC restorer.

5. A multivibrator according to claim 3 including a capacitor in parallel with said pair of transistors, said capacitor being fed through a resistor by a power supply.

6. A monostable multivibrator comprising a pair of solid state switching devices, an output lead coupled to both said devices, means including an R-C timing circuit coupled to said devices for supplying current to said devices to maintain them conducting, means coupled to said devices and responsive to a trigger signal for diverting current from said devices whereby said devices switch to a nonconducting state, and further comprising a pair of Schmitt triggers, and a digital filter coupling the output of said Schmitt triggers to the input of said multivibrator.

7. Apparatus according to claim 6 wherein said digital filter comprises a pulse width discriminator.

* * * * *